United States Patent
Mentze et al.

(10) Patent No.: US 9,413,623 B2
(45) Date of Patent: Aug. 9, 2016

(54) MULTICAST ROUTING PATH CHECK

(75) Inventors: Duane E. Mentze, Roseville, CA (US); Mark P. Henry, Sacramento, CA (US); Richard J. Rollins, Penryn, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/372,546

(22) PCT Filed: Apr. 26, 2012

(86) PCT No.: PCT/US2012/035238
§ 371 (c)(1),
(2), (4) Date: Jul. 16, 2014

(87) PCT Pub. No.: WO2013/162581
PCT Pub. Date: Oct. 31, 2013

(65) Prior Publication Data
US 2015/0103675 A1  Apr. 16, 2015

(51) Int. Cl.
*H04L 12/26* (2006.01)
*H04L 12/761* (2013.01)
*H04L 12/18* (2006.01)

(52) U.S. Cl.
CPC .......... *H04L 43/0811* (2013.01); *H04L 12/18* (2013.01); *H04L 43/0805* (2013.01); *H04L 45/16* (2013.01)

(58) Field of Classification Search
None
See application file for complete search history.

(56) References Cited

U.S. PATENT DOCUMENTS

| | | | |
|---|---|---|---|
| 6,515,967 B1 | 2/2003 | Wei et al. | |
| 6,917,983 B1 | 7/2005 | Li | |
| 7,110,367 B2 | 9/2006 | Moriya | |
| 7,693,092 B2 | 4/2010 | Nishi | |
| 2003/0135644 A1* | 7/2003 | Barrett | H04Q 3/66 709/238 |
| 2004/0252694 A1 | 12/2004 | Adhikari et al. | |
| 2006/0221975 A1* | 10/2006 | Lo | H04L 12/18 370/395.5 |
| 2006/0262772 A1 | 11/2006 | Guichard et al. | |
| 2007/0217415 A1* | 9/2007 | Wijnands | H04L 12/1836 370/390 |
| 2010/0150047 A1* | 6/2010 | Lee | H04N 21/6371 370/312 |
| 2010/0226260 A1 | 9/2010 | Zinjuvadia et al. | |
| 2010/0246415 A1 | 9/2010 | Nishi et al. | |

OTHER PUBLICATIONS

Asaeda, et al., "Mtrace Version 2: Traceroute Facility for IP Multicast draft-ietf-mboned-mtrace-v2-08", Jul. 2011, 41 pages. https://tools.ietf.org/html/draft-ietf-mboned-mtrace-v2-08.

Hilt, et al., "Toward Multicast Tree Reachability Management," May 2007, 12 pages.

Extended European Search Report, EP Application No. 12875506.3, Date: Oct. 28, 2015, pp. 1-7.

* cited by examiner

*Primary Examiner* — Diane Lo
(74) *Attorney, Agent, or Firm* — Brooks, Cameron & Huebsch, PLLC

(57) ABSTRACT

Embodiments of the present disclosure may include network devices, systems, and methods, including executable instructions and/or logic thereon, to check a multicast routing path. A network device includes a processing resource coupled to a memory. The memory includes program instructions executed by the processing resource to determine if a path between an initiator router and an end point router is available for transferring multicast packets, wherein the path between the initiator router and the end point router includes a number of routers.

12 Claims, 4 Drawing Sheets

MULTICAST ROUTING PATH CHECK

BACKGROUND

Computing networks can include multiple devices including network devices such as routers, switches, and hubs, computing devices such as servers, desktop PCs, laptops, workstations, and peripheral devices, e.g., printers, facsimile devices, and scanners, networked together across a local area network (LAN), a wireless local area network (WLAN), and/or wide area network (WAN).

Multicasting can be used in a network when the same information is needed by a number of devices at the same time. Multicasting can reduce the amount of network resources used when sending the multicasting information to a number of devices by sending the information one time to all of the devices that need the information. Multicasting can include logically routing the multicast information through a network to avoid redundancy and efficiently route the information through the network. In a multicast network, multicast packets can be transferred from special multicast data sourcing routers, such as rendezvous point routers (RPRs) or designated routers (DRs), through other multicast routers on a path in a network. The availability of the multicast routers on a path in a network can determine whether a path can be used to transfer multicast packets between the special multicast data sourcing routers across other routers on a path through the network.

DETAILED DESCRIPTION

Figure 1A:
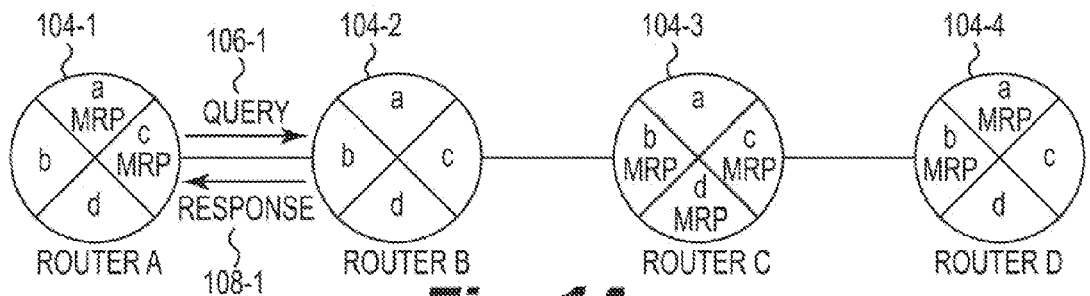
FIGS. 1A-1D illustrate an example of a computing network for checking a multicast routing path according to the present disclosure.

Embodiments of the present disclosure may include network devices, systems, and methods, including executable instructions and/or logic thereon, to check a multicast routing path. A network device includes a processing resource coupled to a memory. The memory includes program instructions executed by the processing resource to determine if a path between an initiator router and an end point router is available for transferring multicast packets, wherein the path between the initiator router and the end point router includes a number of routers.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1B, and a similar element may be referenced as 208 in FIG. 2B. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIGS. 1A-1D illustrate an example of a computing network 100 for checking a multicast routing path. The computing network 100 illustrated in FIGS. 1A-1D includes a number of routers. In some examples, a computing network can include a number of devices networked together in a local area network (LAN) and/or wide area network (WAN) via routers, hubs, switches, and the like. As used herein a "network device" means a switch, router, hub, bridge, access point, etc., e.g., a router having processor and memory resources and connected to a network 100.

In some examples, devices can be connected to one another and/or to other networks using routers, hubs, and/or switches, among other devices. As noted above, such devices can include a processor in communication with a memory and may include network chips having hardware logic, e.g., in the form of application specific integrated circuits (ASICs), associated with the number of network ports. The term "network" as used herein is not limited to the number, type, and/or configuration of devices illustrated in FIG. 1.

As used herein, a network can provide a communication system that links two or more devices, allows users to access resources on other devices, and exchange messages with other users. A network allows users to share resources on their own systems with other network users and to access information on centrally located systems or systems that are located at remote offices. It may provide connections to the Internet or to the networks of other organizations. Users may interact with network-enabled machine readable instruction, e.g., software and/or firmware, applications to make a network request, such as to get a file. Applications may also communicate with network management machine readable instructions, which can interact with network hardware to transmit information between devices on the network.

The computing network 100 illustrated in FIGS. 1A-1D includes routers (104-1), router B (104-2), router C (104-3), and router D (104-4). Each of the routers can include a number of interfaces to the network, where the interfaces are referred to by the router on which they are located and the specific interface on that router. For example interface b on router C is referred to as interface C.b. In some examples, the number of interfaces can have a multicast routing protocol (MRP) running, as indicated by the MRP designation on the routers illustrated in FIGS. 1A-1D. In FIGS. 1A-1D, router 104-1 includes four interfaces, designated as interfaces A.a, A.b, A.c, and A.d. Router 104-2 includes four interfaces, designated as interfaces B.a, B.b, B.c, and B.d. Router 104-3 includes four interfaces, designated as interfaces C.a, C.b, C.c, and C.d. Router 104-4 includes four interfaces, designated as interfaces D.a, D.b, D.c, and D.d.

The routers illustrated in FIGS. 1A-1D can include a number of network connections. A number of network connections and routers can be used to connect a router to another router. In FIGS. 1A-1D, a network connection connects interface A.c of router 104-1 to interface B.b of router 104-2.

Network connection connects interface B.c of router 104-2 to interface C.b of router 104-3. Network connection connects interface C.c of router 104-3 to interface D.b of router 104-4. The network connections can be used to transfer data between the number of routers. The network connections can be used to transfer data from any of the interfaces of a router to another interface of another router if there is a network connection connecting the two routers.

FIGS. 1A-1D illustrate an example of a computing network 100 for checking a multicast routing path. In FIGS. 1A-1D, checking a multicast routing path includes checking the path between an initial router and an end point router, where the end point router is a rendezvous point router (RPR). An end point router can be the final router on a path when checking a multicast routing path. An RPR is a router associated with a group or group range of multicast packets that routers in a network will look to receive the multicast packets in the group or group range. An RPR can be a root of a shared tree in a multicast network. In some examples, a test can be executed on the routers on the path between the initial router and the rendezvous point router. The test can be executed on the initial router, which is the test initiator router (TIR), and can continue to be executed in sequence on each of the routers on the path until an unsuccessful response is received from a router on the path or until a successful response is received from the rendezvous point router. The router on which the test is being executed can be referred to as the router under test (RUT). If an unsuccessful response is received from a router on the path, the test indicates that no path is available for transmitting multicast packets between the initial router and the rendezvous point router on the path. If a successful response is received from the rendezvous point router, the test indicates that the path is available for transmitting multicast packets between the initial router and the rendezvous point router.

In some examples, the test can include sending queries to the routers on the path and receiving responses from the routers on the path. The queries can be received by a router on an ingress interface and sent onto the next router on the path on an egress interface. The responses can include a code indicating whether the test was successful or unsuccessful. The responses can also include the network address of the router that is sending the response and a message that indicates why the test was successful or unsuccessful.

The test that is executed on the routers can include determining if a multicast routing protocol (MRP) is running on the ingress interface of the RUT. If an MRP is not running, an unsuccessful response with a 'No MRP' message is returned to the TIR.

If an MRP is running, the test goes on to determine if the RPR address for the group in the test is a local address on the RUT. If the RPR address is a local address on an interface of the RUT and that interface is up, then a successful response with a 'RP Reached' message is returned to the TIR. If the RPR address is a local address on an interface of the RUT that is down, then an unsuccessful response with a 'RP Reached' message is returned to the TIR. If the RPR address is not a local address on the RUT, the test goes on to perform a multicast Reverse Path Forward (RPF) lookup towards the RPR. A multicast RPF lookup can determine an egress interface of the RUT towards a test end point router, an address of the next hop neighbor, and if the egress interface is running an MRP. If the multicast RPF lookup is a failure, then an unsuccessful response with a 'RPF Fail' message is sent to the TIR.

If the multicast RPF lookup is successful, then the test goes on to determine if the RP-set of the TIR matches the RP-set of the RUT. An RP-set is the range of multicast groups for which an RPR is responsible. If the RP-set of the TIR does not match the RP-set of the RUT, then an unsuccessful response with a 'No RP-set' message or a 'More Specific RP-set' message is sent to the TIR. The 'No RP-set' message indicates that the groups and/or group range in the RP-set of the RUT did not match any of groups and/or group range in the RP-set of the TIR. The 'More Specific RP-set' message indicates that the groups and/or group range in the RP-set of the RUT is narrower than the groups and/or group range in the RP-set of the TIR.

If the RP-set of the TIR matches the RP-set of the RUT, then the test goes onto determine if the unicast next hop neighbor router is a known multicast neighbor router. If the next hop neighbor is not a known multicast neighbor, then an unsuccessful response with a 'No Neighbor' message is sent to the TIR. If the next hop neighbor is a known multicast neighbor, then a successful response with a 'RPR Not Reached' message is sent to the TIR and the test can be executed on the next successive router (e.g., the known multicast neighbor) on the path.

FIGS. 1A-1D illustrate examples of executing a test to check a multicast routing path between an initial router 104-4 and a rendezvous point router (RPR) 104-4. In FIG. 1A, router 104-1 is the test initiator router (TIR). Router 104-1 sends query 106-1 to router 104-2. Router 104-2 can begin execution of query 106-1 by determining if router 104-2 is running an MRP on ingress interface B.b. Router 104-2 is not running an MRP on interface B.b, therefore the test is unsuccessful. Router 104-2 sends response 108-1 to the TIR, router 104-1. Response 108-1 includes a code that indicates the test was unsuccessful, the network address of router 104-2, and a 'No MRP' message that indicates an MRP was not running on router 104-2. The unsuccessful response 108-1 received by the TIR, router 104-1, ends the test.

Figure 1B:
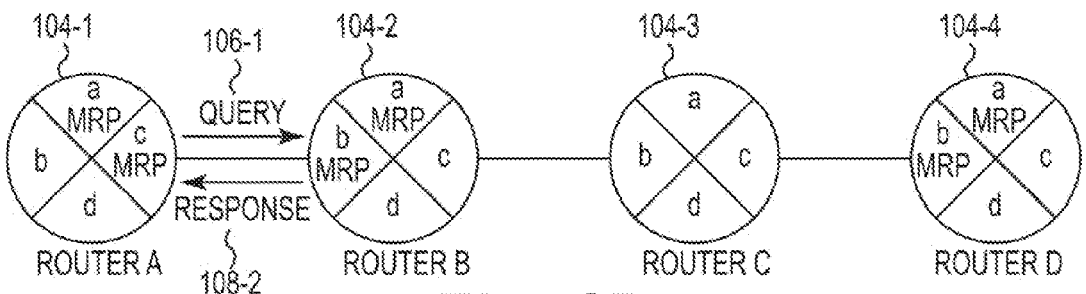

In FIG. 1B, router 104-1 is the test initiator router (TIR). Router 104-1 sends query 106-1 to router 104-2. Router 104-2 can begin execution of query 106-1 by determining if router 104-2 is running an MRP on ingress interface B.b. Router 104-2 is running an MRP on interface B.b, therefore the test goes on to determine if the RPR address for the group in the test is a local address on router 104-2. The RPR address for the group in the test is not a local address on router 104-2, therefore the test goes on to perform a multicast Reverse Path Forward (RPF) lookup towards the RPR, router 104-4. The multicast RPF lookup is a failure, so router 104-2 sends response 108-2 to the TIR, router 104-1. Response 108-2 includes a code that indicates the test was unsuccessful, the network address of router 104-2, and a 'RPF Fail' message that indicates router 104-2 is not the RPR and that an attempt to get to next multicast neighbor towards the RPR was unsuccessful. The unsuccessful response 108-2 received by the TIR, router 104-1, ends the test.

Figure 1C:
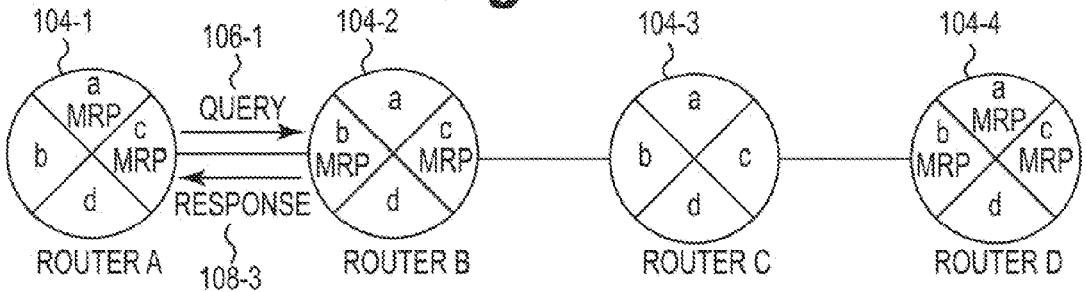

In FIG. 1C, router 104-1 is the test initiator router (TIR). Router 104-1 sends query 106-1 to router 104-2. Router 104-2 can begin execution of query 106-1 by determining if router 104-2 is running an MRP on ingress interface B.b. Router 104-2 is running an MRP on interface B.b, therefore the test goes on to determine if an RPR address is a local address on router 104-2. The RPR address not a local address on router 104-2, therefore the test goes on to perform a multicast Reverse Path Forward (RPF) lookup towards the RPR, router 104-4. The multicast RPF lookup is successful, therefore the test goes on to determine if the RP-set of the TIR matches the RP-set of router 104-2. In FIG. 1C, the RP-set of the TIR, router 104-4, matches the RP-set of router 104-2, therefore the test goes onto determine if the next hop neighbor is a known multicast neighbor. The next hop neighbor, router 104-3 is not a known multicast neighbor, so router 104-2 sends response 108-3 to the TIR, router 104-1. Response 108-3 includes a code that indicates the test was unsuccessful, the network address of router 104-2, and a 'No Neighbor' message that indicates the next hop router of router 104-2 is not a known multicast neighbor. The unsuccessful response 108-3 received by the TIR, router 104-1, ends the test.

Figure 1D:
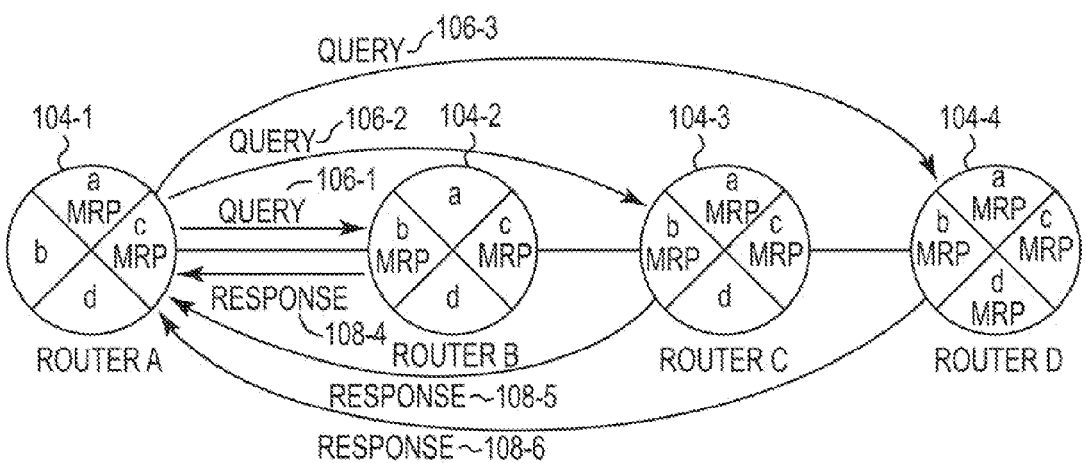

In FIG. 1D, router 104-1 is the test initiator router (TIR). Router 104-1 sends query 106-1 to router 104-2. Router 104-2 can begin execution of query 106-1 by determining if router 104-2 is running an MRP on ingress interface B.b. Router 104-2 is running an MRP on interface B.b, therefore the test goes on to determine if the RPR for the group in the test address is a local address on router 104-2. The RPR address for the group in the test is not a local address on router 104-2, therefore the test goes on to perform a multicast Reverse Path Forward (RPF) lookup towards the RPR, router 104-4. The multicast RPF lookup is successful, therefore the test goes on to determine if the RP-set of the TIR matches the RP-set of router 104-2. In FIG. 1D, the RP-set of the TIR, router 104-4, matches the RP-set of router 104-2, therefore the test goes onto determine if the next hop neighbor is a known multicast neighbor. The next hop neighbor, router 104-3 is a known multicast neighbor, so router 104-2 sends response 108-4 to the TIR, router 104-1. Response 108-4 includes a code that indicates the test was successful, the network address of router 104-2, and a 'RPR Not Reached' message that indicates that router 104-2 is an interim router on the path between the TIR, router 104-1 and the RPR, router 104-4 that successfully passed the test and the test can continue by sending query 106-2 to the next hop router, router 104-3.

Router 104-3 can begin execution of query 106-2 by determining if router 104-3 is running an MRP on ingress interface C.b. Router 104-3 is running an MRP on interface C.b, therefore the test goes on to determine if an RPR address is a local address on router 104-3. The RPR address is not a local address on router 104-3, therefore the test goes on to perform a multicast Reverse Path Forward (RPF) lookup towards the RPR, router 104-4. The multicast RPF lookup is successful, therefore the test goes on to determine if the RP-set of the TIR matches the RP-set of router 104-3.

In some examples, the RP-set of the TIR, router 104-1, does not match the RP-set of router 104-3, therefore router 104-3 can send response 108-5 to the TIR, router 104-1. Response 108-5 includes a code that indicates the test was unsuccessful, the network address of router 104-3, and a 'No RP-set' message that indicates the groups and/or group range in the RP-set of router 104-3 did not match any of groups and/or group range in the RP-set of the TIR, router 104-1, or a 'More Specific RP-set' message that indicates the groups and/or group range in the RP-set of router 104-3 is narrower than the groups and/or group range in the RP-set of the TIR, router 104-1. The unsuccessful response 108-5 received by the TIR, router 104-1, ends the test.

In some examples, the RP-set of the TIR, router 104-1, matches the RP-set of router 104-3, therefore the test goes onto determine if the next hop neighbor is a known multicast neighbor. The next hop neighbor, router 104-4 is a known multicast neighbor, so router 104-3 sends response 108-5 to the TIR, router 104-1. Response 108-5 includes a code that indicates the test was successful, the network address of router 104-3, and a 'RPR Not Reached' message that indicates that router 104-3 is an interim router on the path between the TIR, router 104-1 and the RPR, router 104-4 that successfully passed the test and the test can continue by sending query 106-3 to the next hop router, router 104-4.

Router 104-4 can begin execution of query 106-3 by determining if router 104-4 is running an MRP on ingress interface D.b. Router 104-4 is running an MRP on interface D.b, therefore the test goes on to determine if an RPR address is a local address on router 104-4. The RPR address is a local address on router 104-4, therefore response 108-6 can be sent to the TIR, router 104-1. Response 108-6 can include a code that indicates the test was successful, the network address of router 104-4, and a 'RPR Reached' message that indicates that RPR, router 104-4 was reached. The TIR, router 104-1, can use the responses 108-4, 108-5, and 108-6 to determine if the path including routers 104-1, 104-2, 104-3, and 104-4 is healthy and available for transmitting multicast packets between router 104-1 and router 104-4. In some examples, the successful responses received by a TIR can indicate that a path is healthy and available for transmitting multicast packets between a TIR and a RPR. In some examples, the unsuccessful responses received by a TIR can indicate that a path is not healthy and is not available for transmitting multicast packets between a TIR and a RPR. The unsuccessful response received by a TIR can also be used to determine where a path is broken and what needs to fixed on a router to make that router a healthy router on the path.

FIGS. 2A-2D illustrate an example of a computing network 200 for checking a multicast routing path. The computing network 200 illustrated in FIGS. 2A-2D includes routers 204-1 coupled to router 204-2, router 204-2 coupled to router 204-3, and router 204-3 coupled to a data source. FIGS. 2A-2D illustrate an example of a computing network 200 for checking a multicast routing path.

In FIGS. 2A-2D, checking a multicast routing path includes checking the path between an initial router and an end point router, where the end point router is a source designated router (DR). A source DR is the router closest to a data source on a shortest path tree in a multicast network. The source designated router can be the router that receives data from a source to send as multicast packets throughout a network. In some examples, a test can be executed on the routers on the path between the initial router and the source designated router. The test can be executed on the initial router, which is the test initiator router (TIR), and can continue to be executed in sequence on each of the routers on the path until an unsuccessful response is received from a router on the path or until a successful response is received from the source designated router. The router on which the test is being executed can be referred to as the router under test (RUT). If an unsuccessful response is received from a router on the path, the test indicates that the path is unavailable for transmitting multicast packets between the initial router and the source designated router on the path. If a successful response is received from the source designated router, the test indicates that the path is available for transmitting multicast packets between the initial router and the source designated router on the path.

In some examples, the test can include sending queries to the routers on the path and receiving responses from the routers on the path. The responses can include a code indicating whether the test was successful or unsuccessful. The responses can also include the network address of the router that is sending the response and a message that indicates why the test was successful or unsuccessful.

The test that is executed on the routers can include determining if a multicast routing protocol (MRP) is running on the RUT. If an MRP is not running, an unsuccessful response with a 'No MRP' message is returned to the TIR.

If an MRP is running, the test goes on to determine if a multicast source is directly connected to the RUT. If the multicast source is directly connected to the RUT, then a successful response with a 'DR Reached' message is returned to the TIR. If the multicast source is not directly connected to the RUT, the test goes on to perform a multicast Reverse Path Forward (RPF) lookup towards the multicast source. If the multicast RPF lookup is a failure, then an unsuccessful response with a 'RPF Fail' message is sent to the TIR.

If the multicast RPF lookup is successful, then the test goes onto determine if the next hop neighbor is a known multicast neighbor. If the next hop neighbor is not a known multicast neighbor, then an unsuccessful response with a 'No Neighbor' message is sent to the TIR. If the next hop neighbor is a known multicast neighbor, then a successful response with a 'DR Not Reached' message is sent to the TIR and the test can be executed on the next successive router (e.g., the known multicast neighbor) on the path.

Figure 2A:
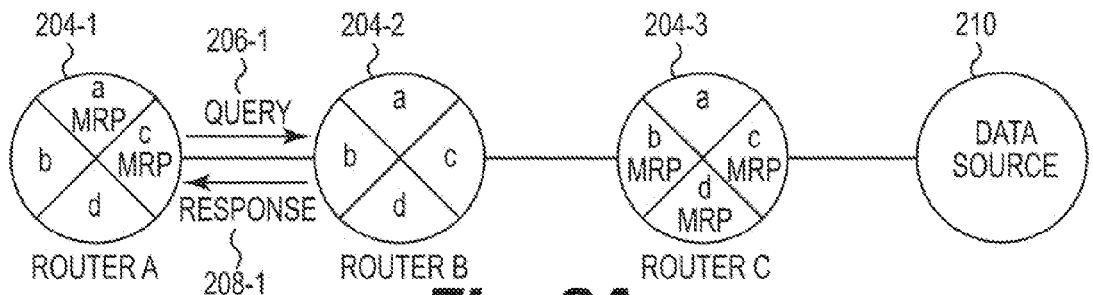
FIGS. 2A-2D illustrate an example of a computing network for checking a multicast routing path according to the present disclosure.

FIGS. 2A-2D illustrate examples of executing a test to check a multicast routing path between an initial router 204-1 and source designated router (DR) 204-3. In FIG. 2A, router 204-1 is the test initiator router (TIR). Router 204-1 sends query 206-1 to router 204-2. Router 204-2 can begin execution of query 206-1 by determining if router 204-2 is running an MRP on ingress interface B.b. Router 204-2 is not running an MRP on interface B.b, therefore the test is unsuccessful. Router 204-2 sends response 208-1 to the TIR, router 204-1. Response 208-1 includes a code that indicates the test was unsuccessful, the network address of router 204-2, and a 'No MRP' message that indicates an MRP was not running on router 204-2. The unsuccessful response 208-1 received by the TIR, router 204-1, ends the test.

Figure 2B:
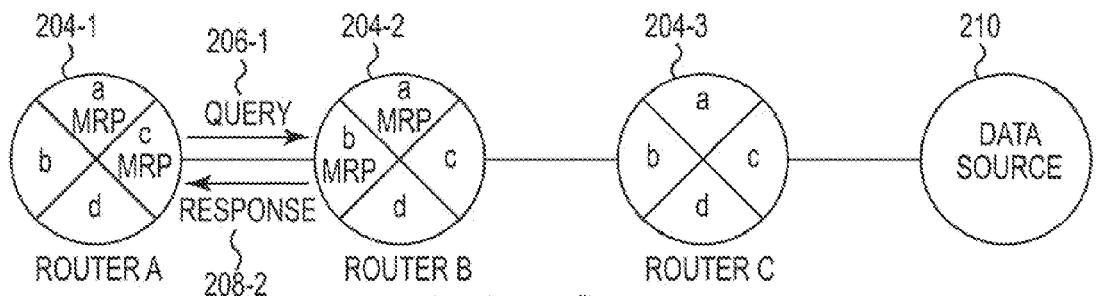
Figure 2C:
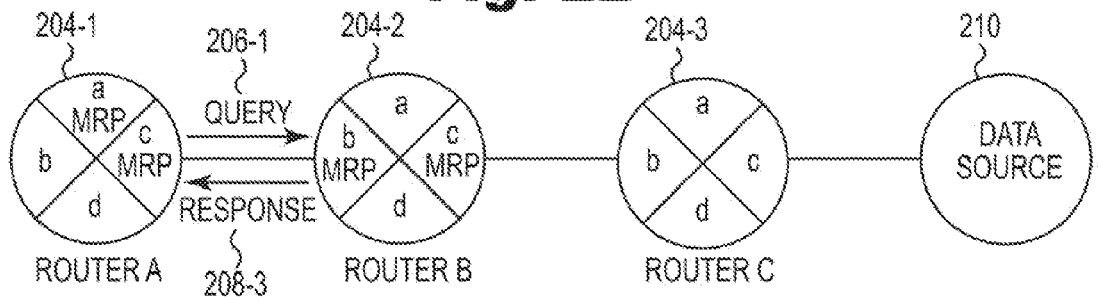

In FIG. 2B, router 204-1 is the test initiator router (TIR). Router 204-1 sends query 206-1 to router 204-2. Router 204-2 can begin execution of query 206-1 by determining if router 204-2 is running an MRP. Router 204-2 is running an MRP, therefore the test goes on to determine if the multicast source of data source 210 is directly connected to router 204-2. The multicast source of data source 210 is not directly connected to router 204-2, therefore the test goes on to perform a multicast Reverse Path Forward (RPF) lookup towards the source DR, router 204-4. The multicast RPF lookup is a failure, so router 104-2 sends response 208-2 to the TIR, router 204-1. Response 208-2 includes a code that indicates the test was unsuccessful, the network address of router 204-2, and a 'RPF Fail' message that indicates router 204-2 is not the source DR and that an attempt to get to next multicast neighbor towards the source DR was unsuccessful. The unsuccessful response 208-2 received by the TIR, router 204-1, ends the test.

In FIG. 1C, router 204-1 is the test initiator router (TIR). Router 204-1 sends query 206-1 to router 204-2. Router 204-2 can begin execution of query 206-1 by determining if router 204-2 is running an MRP. Router 204-2 is running an MRP, therefore the test goes on to determine if the multicast source of data source 210 is directly connected to router 204-2. The multicast source of data source 210 is not directly connected to router 204-2, therefore the test goes on to perform a multicast Reverse Path Forward (RPF) lookup towards the source DR, router 204-4. The multicast RPF lookup is successful, therefore the test goes on to determine if the next hop neighbor is a known multicast neighbor. The next hop neighbor, router 204-3 is not a known multicast neighbor, so router 204-2 sends response 208-3 to the TIR, router 204-1. Response 208-3 includes a code that indicates the test was unsuccessful, the network address of router 204-2, and a 'No Neighbor' message that indicates the next hop router of router 204-2 is not a known multicast neighbor. The unsuccessful response 208-3 received by the TIR, router 104-1, ends the test.

Figure 2D:
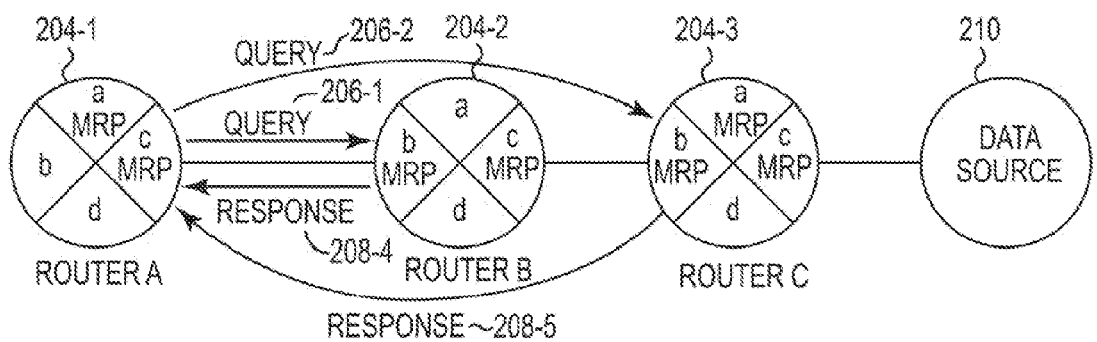

In FIG. 2D, router 204-1 is the test initiator router (TIR). Router 204-1 sends query 206-1 to router 204-2. Router 204-2 can begin execution of query 206-1 by determining if router 204-2 is running an MRP. Router 204-2 is running an MRP, therefore the test goes on to determine if the multicast source of data source 210 is directly connected to router 204-2. The multicast source of data source 210 is not directly connected to router 204-2, therefore the test goes on to perform a multicast Reverse Path Forward (RPF) lookup towards the source DR, router 204-4. The multicast RPF lookup is successful, therefore the test goes on to determine if the next hop neighbor is a known multicast neighbor. The next hop neighbor, router 204-3 is a known multicast neighbor, so router 204-2 sends response 208-4 to the TIR, router 204-1. Response 208-4 includes a code that indicates the test was successful, the network address of router 204-2, and a 'DR Not Reached' message that indicates that router 204-2 is an interim router on the path between the TIR, router 104-1 and the source DR, router 104-4 that successfully passed the test and the test can continue by sending query 206-2 to the next hop router, router 204-3.

Router 204-3 can begin execution of query 206-2 by determining if router 204-3 is running an MRP. Router 204-3 is running an MRP, therefore the test goes on to determine if the multicast source of data source 210 is directly connected to router 204-3. The router 204-3 is directly connected to the multicast source of data source 210, therefore response 208-5 can be sent to the TIR, router 204-1. Response 208-5 can include a code that indicates the test was successful, the network address of router 204-3, and a 'DR Reached' message that indicates that source DR, router 204-3, was reached. The TIR, router 204-1, can use the responses 208-4 and 208-5 to determine if the path including routers 204-1, 204-2, and 204-3, and 104-4 is healthy and available for transmitting multicast packets between router 204-1 and router 204-4. In some examples, the successful responses received by a TIR can indicate that a path is healthy and available for transmitting multicast packets between a TIR and a source DR. In some examples, the unsuccessful responses received by a TIR can indicate that a path is not healthy and is not available for transmitting multicast packets between a TIR and a source DR. The unsuccessful response received by a TIR can also be used to determine where a path is broken and what needs to fixed on a router to make that router a healthy router on the path.

Figure 3:
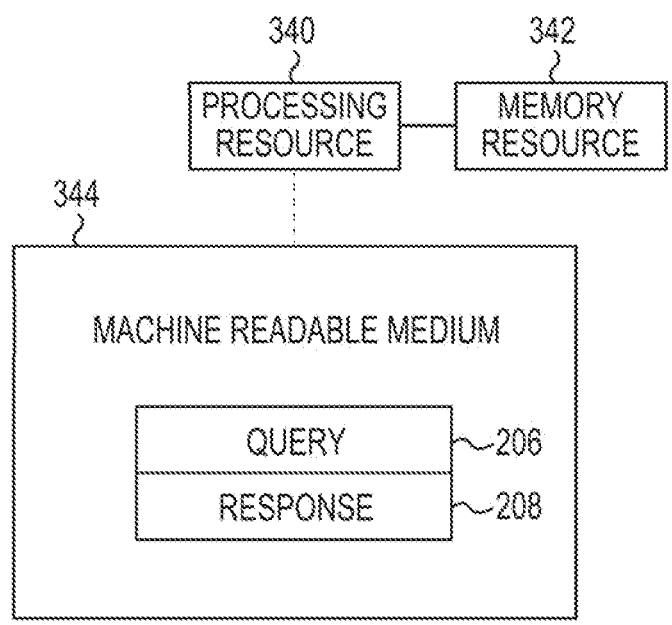
FIG. 3 is a block diagram illustrating a processing resource, a memory resource, and a machine readable medium according to the present disclosure.

FIG. 3 is a block diagram illustrating a processing resource 340, a memory resource 342, and a machine readable medium 344 according to the present disclosure. The processing resource 340 and the memory resource 342 can be local to a computing network, such as on a router. The machine readable medium 344 (e.g., a tangible, non-transitory medium) and/or the memory resource 342 can store a set of instructions (e.g., software, firmware, etc.) executable by the processing resource 340. The machine readable medium can be local to a router or remote therefrom. For those examples in which the machine readable medium is remote from the router, the instructions can be loaded into the memory resource 342 of the router The instructions stored in the machine readable medium 344 can be executed as a programmable option of the router. For example, a network administrator can enable the functionality provided by portions, or all, of the instructions according to the programmable option. Providing the same as a programmable option can be beneficial because various examples of the present disclosure may not be compliant with a number of standards for wireless transmission (e.g., IEEE 802.11). In some examples, the functionality provided by the instructions can, by default, be disabled, and only enabled according to the programmable option, however examples are not so limited.

The instructions can be executed to transmit a query 306 to a router in a network on a path from an initial router to an end point router. The query 306 can be received by a router on a path from an initial router to an end point router. Upon receiving the query 306, the instructions can be executed by the router on the path from the initial router to the end point router to perform a test on the router and to send a response 308 indicating the results of the test to the initial router.

The instructions can be executed to compile the information from the responses 308 to check a multicast routing path. The check of a multicast routing path can include information regarding the availability of routers on a path in a network to transfer multicast packets between an initial router and an end point router. The check of a multicast routing path can include information regarding which routers on a path in a network are causing the path to be unavailable to transfer multicast packets between an initial router and an end point router.

Figure 4:
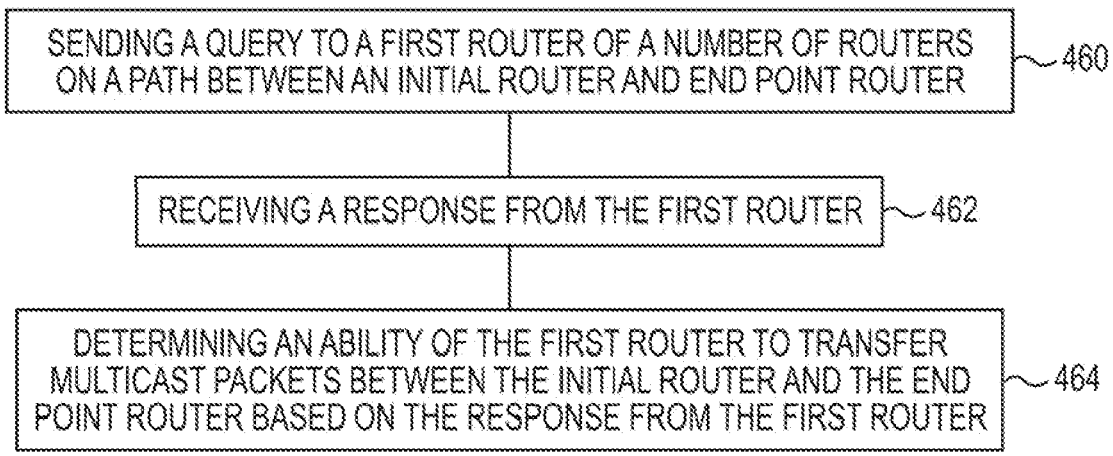
FIG. 4 provides a flow chart illustrating an example of a method for checking a multicast routing path according to the present disclosure.

FIG. 4 provides a flow chart illustrating an example of a method for checking a multicast routing path. At step 460, a query can be sent to a first router of a number of routers on a path between an initial router and an end point router. The query can be executed to determine if the first router is running an MRP, if the first router is the end point router, if the multicast RPF lookup was successful, and/or if the next hop router of the first router is a known multicast neighbor. At step 462, receiving a response can be received from the first router. The response can indicate success or failure of a test, the reason that the test succeeded or failed, and whether the test should end or if it should continue by querying the next hop neighbor router. At step 464, an ability of the first router to transfer multicast packets between the initial router and the end point router can be determined based on the response from the first router. If the response indicated that the test was successful, the test can be complete when the first router is the end point router or the test can continue by querying the next hop router. If the response indicated that the test was unsuccessful, the test can be complete and the response can be used to determine how to fix the router so the router can be used to transfer multicast packets between the initial router and the end point router It is to be understood that the above description has been made in an illustrative fashion, and not a restrictive one. Although specific examples have been illustrated and described herein, other component arrangements and device logic can be substituted for the specific examples shown. Accordingly, the present disclosure is not limited to the use of more than one spatial stream. The present disclosure is not limited to the use of more than one antenna for a particular device.

What claimed is:

1. A network device to perform a multicast routing path check, comprising:
    a processing resource; and
    a memory resource coupled to the processing resource, wherein the memory resource stores instructions executable by the processing resource to:
        determine if a path between an initiator router and an end point router is available for transferring multicast packets, wherein the path between the initiator router and the end point router includes a number of routers, the end point router is a rendezvous point router, and a test is performed on each of the number of routers on the path between the initial router and the end point router to determine if a rendezvous point (RP) set on each of the number of routers matches an RP set on the initial router and if a rendezvous point router network address is a local address on an interface that is up for each of the number of routers.

2. The device of claim 1, wherein the test determines if a multicast routing protocol (MRP) is running on an ingress interface on each of the number of routers, determines if an MRP is running on an egress interface towards the end point router on each of the number of routers, and if a next hop neighbor of each of the number of routers is a known multicast neighbor.

3. The device of claim 1, wherein the end point router is a source designated router.

4. The device of claim 3, wherein the test determines if a network address of the source designated router is directly connected to one of the number of routers.

5. A method to perform a multicast routing path check, comprising, by a processing resource:
    determine if a path between an initiator router and an end point router is available for transferring multicast packets, wherein the path between the initiator router and the end point router includes a number of routers, the end point router is a rendezvous point router, and a test is performed on each of the number of routers on the path between the initial router and the end point router to determine if a rendezvous point (RP) set on each of the number of routers matches an RP set on the initial router and if a rendezvous point router network address is a local address on an interface that is up for each of the number of routers.

6. The method of claim 5, wherein the test determines if a multicast routing protocol (MRP) is running on an ingress interface on each of the number of routers, determines if an MRP is running on an egress interface towards the end point router on each of the number of routers, and if a next hop neighbor of each of the number of routers is a known multicast neighbor.

7. The method of claim 5, wherein the end point router is a source designated router.

8. The method of claim 7, wherein the test determines if a network address of the source designated router is directly connected to one of the number of routers.

9. A non-transitory computer-readable storage medium storing instructions executable by a processor resource to:
    determine if a path between an initiator router and an end point router is available for transferring multicast packets, wherein the path between the initiator router and the end point router includes a number of routers, the end point router is a rendezvous point router, and a test is performed on each of the number of routers on the path between the initial router and the end point router to determine if a rendezvous point (RP) set on each of the number of routers matches an RP set on the initial router and if a rendezvous point router network address is a local address on an interface that is up for each of the number of routers.

10. The medium of claim 9, wherein the test determines if a multicast routing protocol (MRP) is running on an ingress interface on each of the number of routers, determines if an MRP is running on an egress interface towards the end point router on each of the number of routers, and if a next hop neighbor of each of the number of routers is a known multicast neighbor.

11. The medium of claim 9, wherein the end point router is a source designated router.

12. The medium of claim 11, wherein the test determines if a network address of the source designated router is directly connected to one of the number of routers.

* * * * *